(12) United States Patent
Anghel et al.

(10) Patent No.: US 6,809,496 B2
(45) Date of Patent: Oct. 26, 2004

(54) POSITION SENSOR EMULATOR FOR A SYNCHRONOUS MOTOR/GENERATOR

(75) Inventors: Cristian E. Anghel, Mississauga (CA); Rocco Divito, Etobicoke (CA); Nicolae A. Morcov, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/244,496

(22) Filed: Sep. 16, 2002

(65) Prior Publication Data

US 2004/0052217 A1 Mar. 18, 2004

(51) Int. Cl.$^7$ .............................. H02P 1/46; H02P 7/36
(52) U.S. Cl. ...................... 318/700; 318/138; 318/254; 318/439; 318/430; 318/432; 318/434
(58) Field of Search .................. 318/138, 254, 318/439, 430–434, 700, 560, 701, 731

(56) References Cited

U.S. PATENT DOCUMENTS

| | | | |
|---|---|---|---|
| 3,748,555 A | * 7/1973 | Hoffmfan | 318/718 |
| 4,763,058 A | * 8/1988 | Heining et al. | 318/807 |
| 5,182,499 A | * 1/1993 | Inaji et al. | 318/254 |
| 5,363,032 A | 11/1994 | Hanson et al. | |
| 5,384,527 A | 1/1995 | Rozman et al. | |
| 5,428,275 A | 6/1995 | Carr et al. | |
| 5,430,362 A | 7/1995 | Carr et al. | |
| 5,444,349 A | 8/1995 | Rozman et al. | |
| 5,461,293 A | 10/1995 | Rozman et al. | |
| 5,493,200 A | 2/1996 | Rozman et al. | |
| 5,495,162 A | 2/1996 | Rozman et al. | |
| 5,495,163 A | 2/1996 | Rozman et al. | |
| 5,581,168 A | * 12/1996 | Rozman et al. | 318/723 |
| 5,585,709 A | * 12/1996 | Jansen et al. | 318/807 |
| 5,594,322 A | 1/1997 | Rozman et al. | |
| 5,608,300 A | 3/1997 | Kawabata et al. | |
| 5,644,205 A | * 7/1997 | Nguyen Phuoc et al. | 318/801 |
| 5,920,162 A | 7/1999 | Hanson et al. | |
| 6,081,091 A | * 6/2000 | Mitchell et al. | 318/685 |
| 6,271,720 B1 | * 8/2001 | Sevastopoulos | 327/556 |
| 6,344,725 B2 | * 2/2002 | Kaitani et al. | 318/700 |
| 6,414,462 B2 | * 7/2002 | Chong | 318/701 |

FOREIGN PATENT DOCUMENTS

EP 0748039 A2 6/1996

OTHER PUBLICATIONS

Krause, Paul C. et al., "Analysis of Electric Machinery," IEEE Power Engineering Society, Reference–Frame Theory, p. 135 and p. 161, 1995, New York.

Analog Devices, "Universal Syhnchro/Resolver Transformer Isolated Interface," AD2S75, Rev. A, C1906–7.5–4/94, pp. 1–8.

Analog Devices, "Variable Resolution, Monolithic Resolver–to–Digital Converter," AD2S80A, Rev. B, C00008–2.5–9/00[rev. B], pp. 1–16.

* cited by examiner

*Primary Examiner*—David Martin
*Assistant Examiner*—Tyrone Smith
(74) *Attorney, Agent, or Firm*—Larry J. Palguta (57) ABSTRACT

A position sensor emulator system and method for use in the control of synchronous machines are disclosed. The position sensor emulator system (220) includes a first bandpass filter (222) that filters phase voltage signals from a stator of a synchronous machine (230). A converter (224) that converts the filtered phase voltages into balanced two-phase quadrature signals. A rectifier (226) that rectifies exciter voltage signals of the synchronous machine (230) and a second bandpass filter (228) that filters the rectified exciter voltage signals to generate a reference signal.

27 Claims, 8 Drawing Sheets

Conventional Art

FIG. 1A

Conventional Art

POSITION SENSOR EMULATOR FOR A SYNCHRONOUS MOTOR/GENERATOR

FIELD OF THE INVENTION

The present invention relates to position sensor emulators for wound rotor motors and generators of aerospace and industrial power and drive systems. Further, the invention relates to sensorless control of wound rotor motors and generators.

BACKGROUND OF THE INVENTION

Conventionally motor controllers for applications requiring a controlled torque use discrete sensors to determine rotor position in a rotating machine. This technique however increases system complexity and decreases system reliability. The electric machine must have a sensor built in or attached mechanically to the rotor. Interfaces and wiring must be added for control (excitation) and feedback signals between the controller and the sensor. Typical sensors include resolvers, encoders, and the like. The location of the rotating machine could be far from the controller, creating the need for unwanted extra wiring in the system.

Figure 1A:
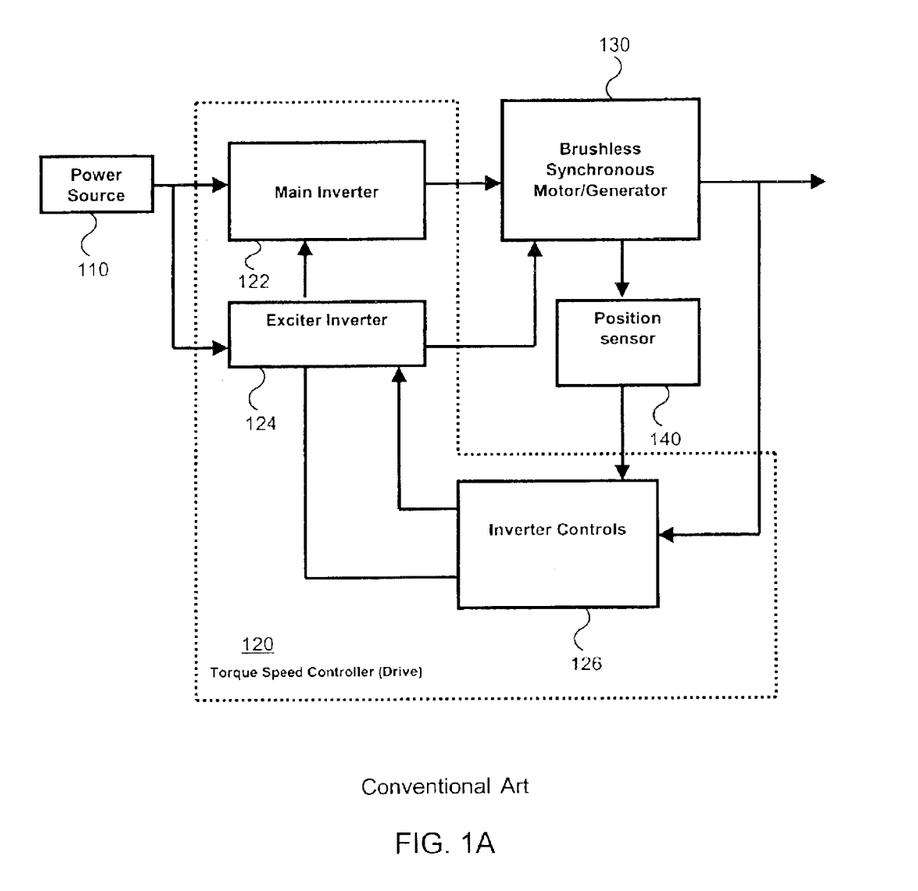
FIG. 1A is a conventional system using a position sensor.

A conventional motor control system having a position sensor is shown in FIG. 1A. The primary components of the system include a power source 110, a controller 120, a motor/generator 130 and a speed/position sensor 140. The Motor/Generator and Starter/Generator terms are used interchangeably in the following descriptions and claims. The controller 120 includes an inverter controls 126 that receives signals from the sensor 140 (e.g., speed/rotor position) and the motor/generator (e.g., current, voltage). These signals are used to control the main inverter 122 and exciter inverter 124, thereby providing a conventional closed loop system to regulate the current as a function of the speed of the motor/generator 130, as will be appreciated by those skilled in the art.

Figure 1B:
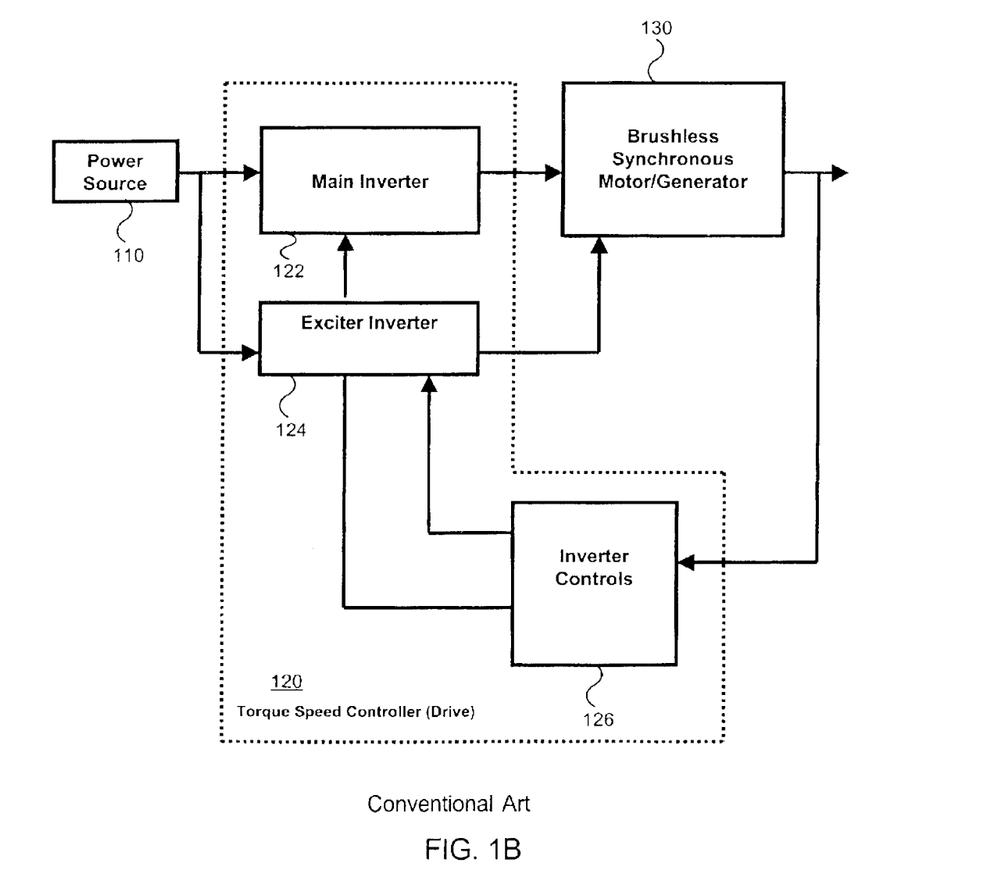
FIG. 1B is a conventional sensorless system.

FIG. 1B illustrates a block diagram of a sensorless system. As is apparent from the block diagram, the sensor and related signals to the controller 120 are absent. Those skilled in the art will appreciate that this requires the controller 120 to process the rotor position/speed of the motor/generator to allow closed loop current regulation or to execute certain control functions (e.g., current control) or operate in an open loop mode.

However, sensorless motor control techniques can increase system reliability and eliminate the need for extra wiring in the system. In addition these techniques will eliminate the need for a position sensor and also reduce the system cost. A sensorless motor control technique is a more flexible/adaptable solution for a motor drive system than one that relies on a separate position sensor. It is particularly valuable for aircraft system where increased reliability and reduction of weight (e.g., through elimination of the sensor and additional wiring) are extremely important.

Motor controller applications in systems with existing electrical machines can use a sensorless motor control scheme. For example, sensorless control systems are advantageous in retrofit applications, where a sensor and appropriate wiring may be unavailable and not easily installed. Some of these systems have synchronous generators that can be used as a motor/generator but they do not have discrete sensors. Additional applications for this technique include motor controllers in the environmental control systems, electric power systems, industrial drive systems, and the like.

U.S. Pat. No. 5,920,162 issued to Hanson et al. describes a system that utilizes feed through from the exciter winding of twice the fundamental frequency of excitation thereof which is detected synchronously in one of a plurality of stator phase windings of a main motor generator. The one of a plurality of stator phase windings is maintained in a non-commutated state during operation as a motor to determine rotor position of the main motor generator for control of commutation of current in all other commutated stator phase windings. The amplitude modulation of the voltage across each stator phase winding which is maintained in a non-commutated state represents the rotary position of the rotor of the main motor generator which is used to control commutation of current flow in an at least one and preferably all remaining commutated stator phase.

However, although the above-described system operates as in a sensorless mode, it requires that the position sensing take place only on the non-commutated stator windings. Accordingly, the position sensor emulation must shift from phase to phase as respective phases are commutated, which complicates the sensor emulation. Therefore, it is desired to have a sensor emulation technique and sensorless control system that truly emulates a continuous position sensor and is not dependent on the commutated state of the stator windings. Further, the prior art sensorless systems fail to provide an initial position sensing, which is beneficial at start-up under high load torque of the motor/generator.

SUMMARY OF THE INVENTION

In accordance with the present invention, the deficiencies in prior systems are overcome by providing a position sensor emulator that processes continuously the rotor position from, and including, the standstill to a certain speed. This position sensor emulator includes a first bandpass filter that filters phase voltage signals from a stator of a synchronous machine. A converter that converts the filtered phase voltages into balanced two-phase quadrature signals. Additionally, the position sensor emulator can provide a rectifier that rectifies exciter voltage signals of the synchronous machine and a second bandpass filter that filters the rectified exciter voltage signals to generate a reference signal.

According to another embodiment of the invention, a method for emulating a position sensor comprises: bandpass filtering phase voltage signals from a stator of a synchronous machine; and converting the filtered phase voltages into balanced two-phase quadrature signals. Additionally, the method can provide a reference signal by rectifying exciter voltage signals of the synchronous machine; and bandpass filtering the rectified exciter voltage signals to generate a reference signal.

BRIEF DESCRIPTION OF THE DRAWINGS

A more complete understanding of the present invention will become apparent from the following description taken in conjunction with the accompanying drawings, wherein.

DETAILED DESCRIPTION OF THE PREFERRED EMBODIMENTS

Aspects of the invention are disclosed in the accompanying description. Alternate embodiments may be devised without departing from the spirit or the scope of the invention.

In the following description and accompanying drawings like elements are denoted with similar reference numbers. Further, well-known elements and related explanations are omitted so as not to obscure the inventive concepts presented herein.

Figure 2:
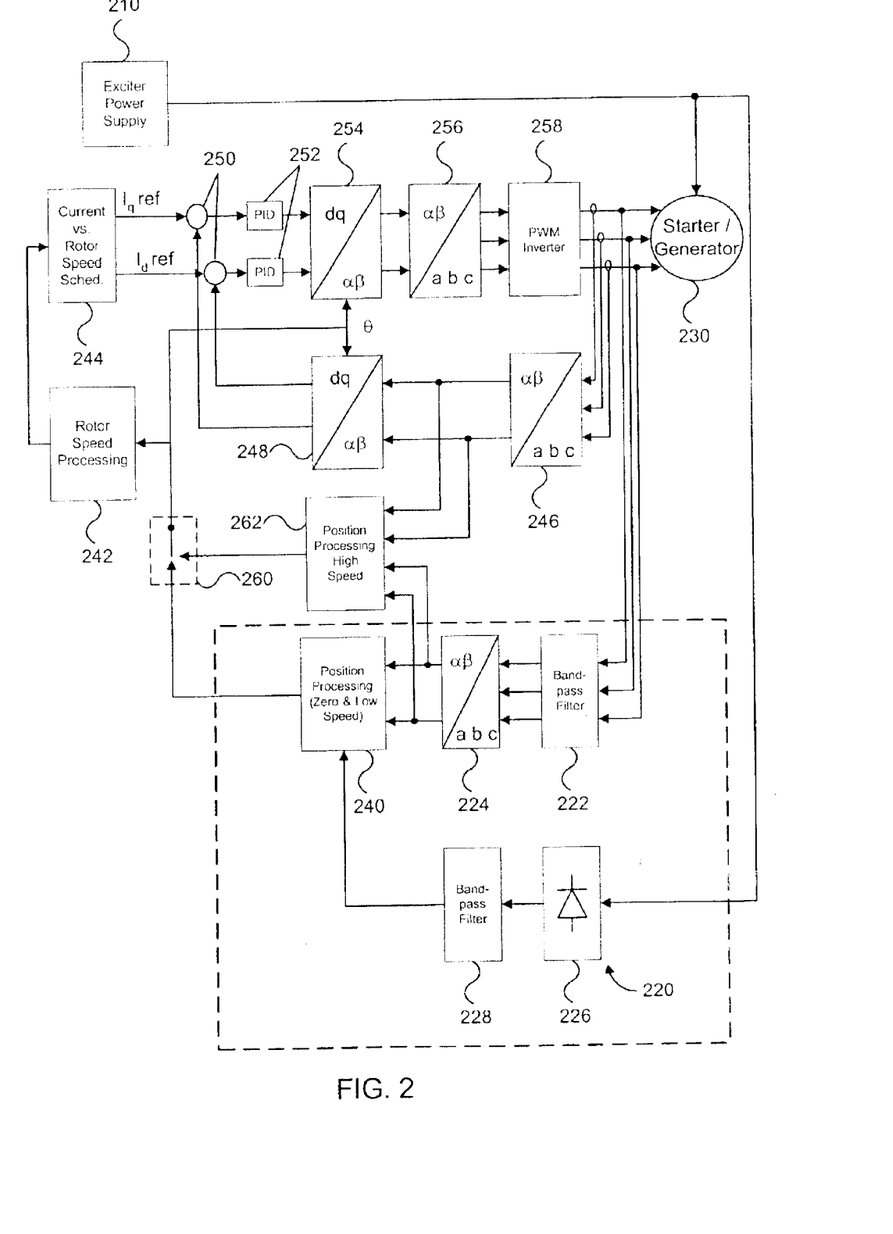
FIG. 2 is a block diagram of a position sensor emulator and related system according to an embodiment of the present invention.

FIG. 2. illustrates block diagram of a position sensor emulator according to an embodiment of the present invention. The present invention provides a sensorless system that emulates a resolver-type position sensor by using the similarity between the main rotor of the synchronous machine and a position sensor or resolver. Those skilled in the art will appreciate that controlled AC power from the exciter power inverter 210 is applied to the field winding of the rotor of the motor/generator 230 resulting in the main rotor behaving as a position sensor, due to its salient construction. This reaction is similar to a resolver-type position sensor. Accordingly, the sensorless system of the present invention continuously detects the voltages on the main stator phase windings of the motor/generator 230 to produce a set of signals that define the rotor position. The signals are obtained from the stator voltage of the motor/generator after being fed through bandpass filter 222 and converter 224. For example, converter 224 can use the well known Clarke transformation (a,b,c/α,β) that converts three-phase quantities (a,b,c) into balanced two-phase quadrature quantities (α,β). Additionally, the exciter voltage from the exciter power supply 210 is passed through rectifier 226 and bandpass filter 228. The output signals from the converter 224 and bandpass filter 228 are fed to a position processing block 240. Those skilled in the art will appreciate that the position sensor emulator 220 comprises elements 222–228. However, if only the balanced two-phase quadrature quantities (i.e., sine and cosine signals) are required for feedback to the drive system, then elements 226 and 228 are not required. The position sensor emulator 220 of the present invention provides output signals that emulate signals of a resolver. Therefore, the position processing block 240 can be a conventional position processing block. A more detailed description of these components is provided below in relation to FIGS. 4 and 5.

Those skilled in the art will appreciate that the remaining portion of the block diagram is an exemplary diagram of a typical inverter and control system for a motor/generator 230. Therefore, the remaining components will not be described in detail. As shown in this configuration, the rotor position feedback signal is fed into the rotor speed processing block 242, which in turn is fed into the Current vs. Rotor Speed schedule 244 that generates an appropriate current reference signal for the forward loop of the controller. Both quadrature ($I_q$ref) and direct ($I_d$ref) axis current commands are summed by summers 250 with the inner loop current feedback supplied from signal converters 246 and 248 that receive the three phase stator current and the calculated rotor position (angle) and convert and scale it into the appropriate feedback signals. For example, converter 246 can use the previously described Clarke transformation and converter 248 can use the well known Park transformation (α,β/d,q) that converts vectors in 2-phase orthogonal stationary system (α,β) into the rotating reference frame (d,q) using the angle θ of the rotating frame. Corresponding inverse Clarke and Park transformations can be used in converters 256 and 254, respectively. The outputs of the summers 250 are supplied to respective PID regulators 252, which in turn provide command signals to converters 254 and 256. For example, the current is regulated using an analog or digital PID regulator 252 that uses the current schedule demand to generate the signals needed to drive the inverter 258. The control scheme presented functions with a current regulator implemented in d-q frame. Converters 254 and 256 convert the commands from signals for the quadrature and direct axis currents into commands for the individual phases (a, b, c). These commands are then fed into the inverter 258 (e.g., a pulse width modulation (PWM) inverter as shown) which provides the main stator power to motor/generator 230. Although, the above referenced control and inverter system has shown specific elements such as a PID controllers and PWM inverter, those skilled in the art will appreciate that many variations of the controller/inverter configuration are known. Further, the present invention is not limited to a particular controller/inverter scheme because it serves as a true emulator for a position sensor. Therefore, the present invention serves to replace the position sensor signals in conventional systems and is designed to be compatible with control/inverter schemes that use a position sensor for control.

FIG. 2 shows a first configuration of the position sensor emulator and motor/generator control system according to the present invention. In this configuration a switch 260 is used to alter the control scheme in a high speed/zero and low speed condition. When the rotor of motor/generator 230 approaches a certain speed condition (e.g., 10%–25% of top speed) switch 260 changes the rotor position feedback for the inner loop from the zero and low speed position processing block 240 to the high speed position processing block 262. The high-speed position processing block 262 can be accomplished using conventional techniques (e.g., counter EMF). Accordingly, a detailed description of this element is also omitted.

Figure 3:
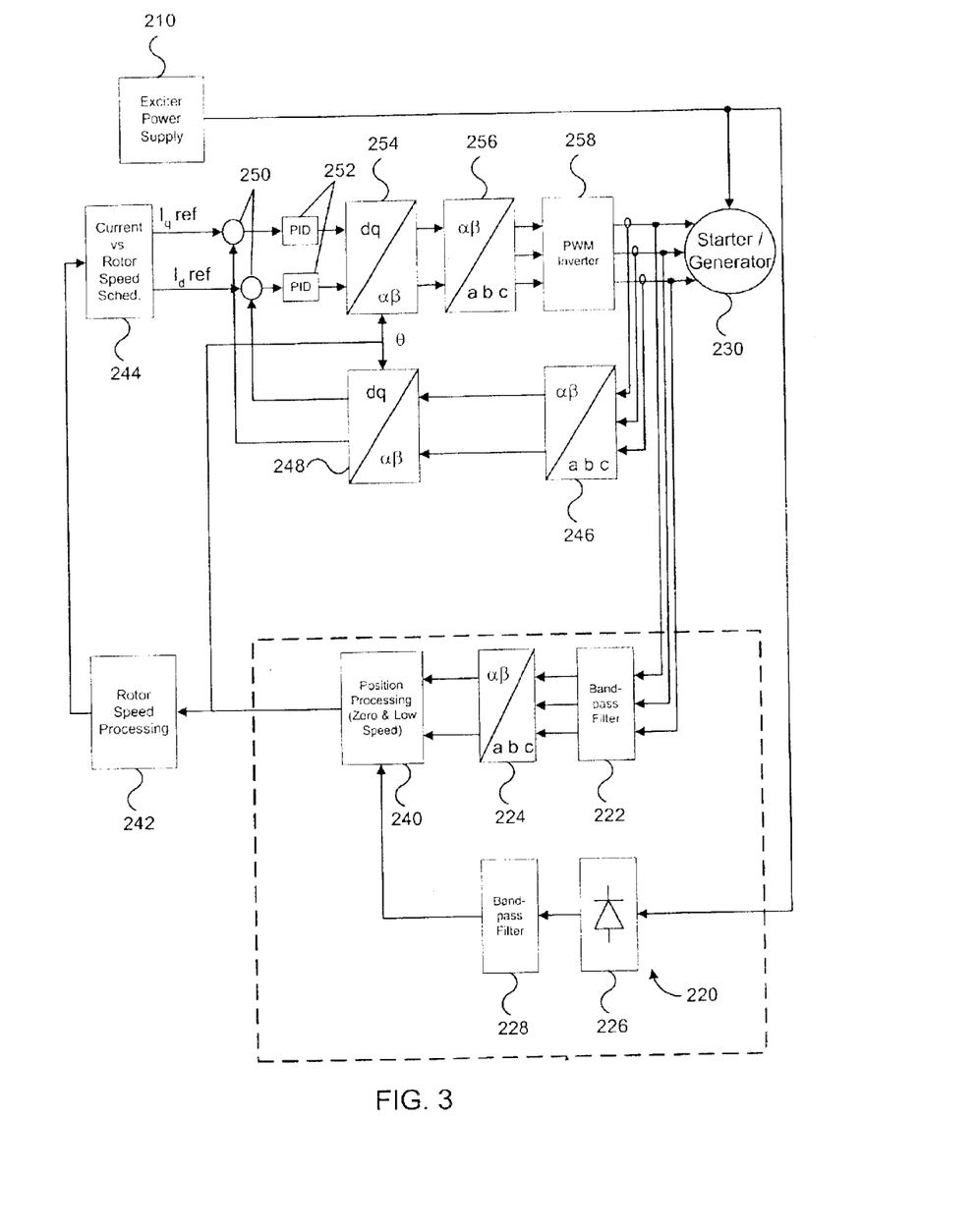
FIG. 3 is a block diagram of a position sensor emulator and related system according to another embodiment of the present invention.

FIG. 3 is a block diagram of a position sensor emulator and related system according to another embodiment of the present invention. In this configuration all elements are the same and operate the same. However, the switch 260 and high speed position sensor emulator 262 is eliminated in this configuration. Accordingly, the position sensor emulator 220 and position processing block 240 are used throughout the speed range of the starter generator 230.

The main stator phase voltages contain three frequency components: the frequency corresponding to the mechanical speed, the inverter switching frequency and a frequency coupled into the main stator from the field winding containing the rotor position information. Therefore, the rotor position/speed can be obtained by proper detection and processing of the frequency components in the main stator phase voltages of the motor/generator 230. Accordingly, the present invention emulates a resolver-type position sensor by using the similarity between the main rotor of the brushless synchronous machine and a position sensor or resolver, as previously noted.

Figure 4:
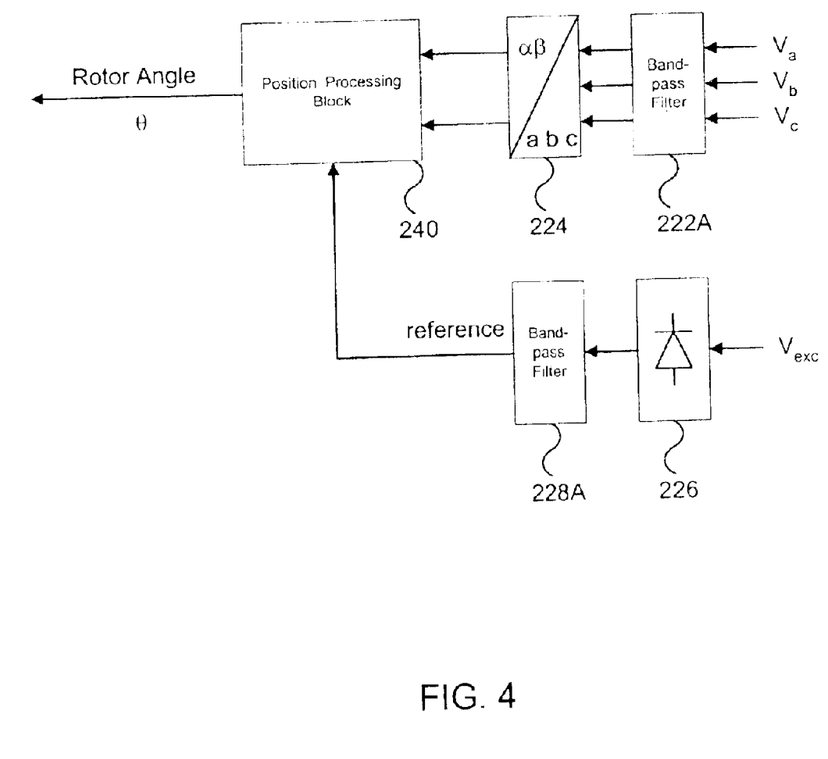
FIG. 4 is a block diagram of showing details of an embodiment of the position sensor emulator and position processing block.

Referring to FIG. 4, an exemplary embodiment of a position sensor emulator for a synchronous motor/generator is shown. Specifically, the blocks in FIG. 4 correspond to the blocks in the dashed regions of FIGS. 2 and 3. Those skilled in the art will appreciate that the position sensor emulator shown in FIG. 4 can be used with both system configurations shown in FIGS. 2 and 3. The bandpass filter 222A receives inputs from the phase voltages ($V_a$, $V_b$, $V_c$) and filters these inputs for the desired frequency. In this embodiment, the pass frequencies correspond to the following equation:

$$f = 2 \cdot N_{ph} \cdot f_{ex} \pm \omega_{et}$$

in which f is the pass frequency of the filter; $N_{ph}$ is the number of phases in the exciter stator; $f_{ex}$ is the frequency of the exciter voltage; and $\omega_{et}$ is the top electrical angular speed of the motor/generator stator (e.g., 2× mechanical speed for a 4-pole machine). For example, in a system having a single phase exciter stator operating at 400 Hz and a top electrical angular speed of the main stator of the motor/generator of 250 Hz, the resulting pass frequencies range would be:

$$f = 2 \cdot 1 \cdot 400 \pm 250 = 550 \text{ to } 1050 \text{ Hz}.$$

Those skilled in the art will appreciate that this is merely an example for a specific configuration and operating condition for a specific motor/generator. Therefore, the above example is provided merely for explanation and not limitation of the present invention.

Referring back to FIG. 4, the filtered signals from bandpass filter 222A are passed to converter 224 that converts the filtered three-phase voltage signals (a,b,c) into balanced two-phase quadrature quantities ($\alpha$,$\beta$), as noted above. These types of conversions/transformations are well known in the art. For example, this conversion can be accomplished as follows:

$$V_\alpha = \frac{1}{3}(2 \cdot V_{ab} - V_{bc} - V_{ca})$$

$$V_\beta = \frac{1}{\sqrt{3}}(V_{ca} - V_{bc})$$

Further details regarding the above-described equations can be found in standard textbooks such as Krause et al., *Analysis of Electric Machinery*, IEEE press, 1995, pages 135–161, which is incorporated herein by reference. Additionally, if the system is balanced the transformation can be reduced to the following equations:

$$V_\alpha = (V_{ab})$$

$$V_\beta = -\frac{1}{\sqrt{3}}(V_{ab} + 2 \cdot V_{bc})$$

which simplifies the calculation of the conversion further. The $V_\alpha$ and $V_\beta$ are equivalent to the sine and cosine outputs of a conventional resolver. The reference signal is provided from the exciter voltage, which is rectified by rectifier 226 and filtered by bandpass filter 228A. Typically, bandpass filter 228A will have the same filter characteristics as bandpass filter 222A. Accordingly, the same equation would apply to both filters 222A and 228A. Because the position sensor emulator replicates the signals of a conventional resolver (e.g., sine, cosine, and reference signals) the position processing block 240 can be implemented by using conventional techniques and equipment. For example, an Analog Devices AD2S80A Resolver-to-Digital converter can be used as the position processing block 240, which receives the emulated signals from the position sensor emulator and converts these signals into a rotor position (i.e., rotor angle). Alternatively, an algorithm can be used to extract the angular position, such as:

$$\theta = \text{Tan}^{-1} \frac{V_\alpha}{V_\beta}.$$

Figure 5:
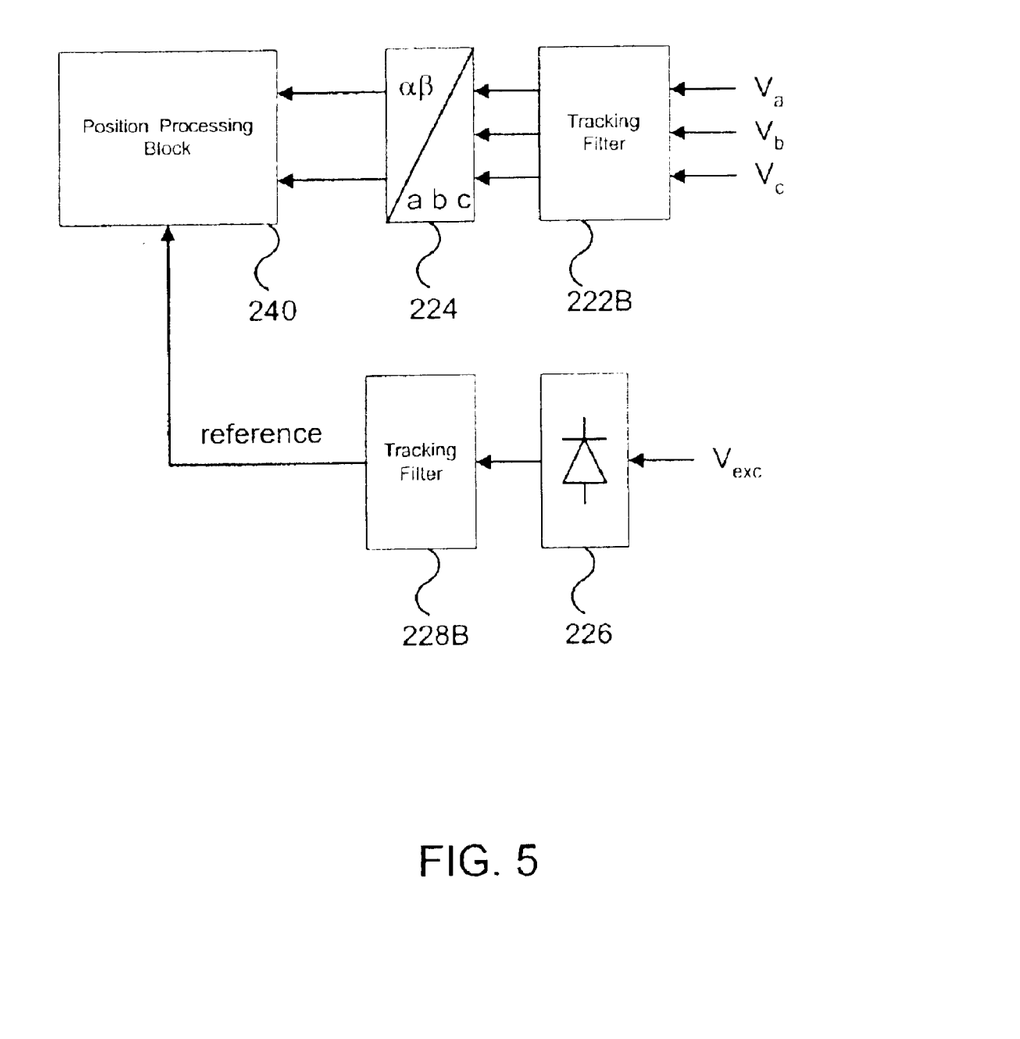
FIG. 5 is an alternative embodiment of a position sensor emulator according to the present invention.

Referring to FIG. 5, an alternative embodiment of a position sensor emulator is shown. Those skilled in the art will appreciate that the position sensor emulator shown in FIG. 5 can also be used with both system configurations shown in FIGS. 2 and 3. The position sensor emulator according to this embodiment also includes a first bandpass filter 222B that filters phase voltage signals from a stator of a synchronous machine 230. A converter 224 converts the filtered phase voltages (a, b, c) into balanced two-phase quadrature signals ($\alpha$, $\beta$). A rectifier 226 rectifies the exciter voltage signals of the synchronous machine 230. A second bandpass filter 228B filters the rectified exciter voltage signals to generate a reference signal. With the exception of filters 222B and 228B, the components of this embodiment and the previous embodiment are the same.

However, in this embodiment the bandpass filters 222B and 228B are tracking filters as opposed to having a fixed passband frequency. The bandpass filters 222B and 228B according to this embodiment have a center frequency that tracks the frequency component containing position information. Therefore, as the speed of the synchronous machine 230 changes, so does the center frequency of the bandpass filters 222B and 228B. For example the center frequency can be defined as:

$$f_c = 2 \cdot N_{ph} \cdot f_{ex} + \omega_e$$

Alternatively, the center frequency can be defined as:

$$f_c = 2 \cdot N_{ph} \cdot f_{ex} - \omega_e$$

wherein $f$ is the passband, $N_{ph}$ is a number of phases in an exciter stator, $f_{ex}$ is the frequency of the exciter voltage, and $\omega_e$ is the electrical angular speed of the stator of the synchronous machine 230.

Further, those skilled in the art will appreciate that other combinations of devices can be added or altered without departing from the scope of the present invention. For example, the position sensor emulator of the present invention can be implemented in an analog, a digital or hybrid configuration. The position sensor can be integrated into the software/hardware of a digital drive system as the signals required (e.g., stator voltage, exciter voltage) will typically be available in both analog and digital form in the drive. The position sensor emulator of the present invention can be used in any drive system that requires torque, speed, and/or position control. For example, aircraft, aerospace, industrial, environmental and commercial power/control systems all meet these requirements, as will be appreciated by those skilled in the art.

Additionally, those skilled in the art will recognize that methods to practice the present invention are apparent from the foregoing description. For example, according to another embodiment of the invention, a method for emulating a position sensor is provided. The method for emulating a position sensor comprises bandpass filtering phase voltage signals from a stator of a synchronous machine; converting the filtered phase voltages into balanced two-phase quadrature signals; rectifying exciter voltage signals of the synchronous machine; and bandpass filtering the rectified exciter voltage signals to generate a reference signal.

Further, many variations can be made to the above steps without departing from the scope of the invention. For example, the bandpass filtering can be either fixed or tracking, as discussed above. Additionally, switching position feedback from the position sensor emulation during a zero and low speed condition, to a high speed control scheme that does not use the position sensor emulator can be performed, also discussed above in regard to FIG. 4.

Additionally, those skilled in the art, will appreciate that the frequency of voltage supplied to the starter/generator exciter can be modified, increased or decreased (including zero frequency), during the start to achieve results equivalent with the filtering methods described herein. Thus, the fixed bandpass filter configuration can "track" the frequency component containing position information because this frequency can be adjusted to coincide with a fixed bandpass filter by increasing or decreasing the exciter frequency in accordance with the speed change of the synchronous machine.

Figure 6:
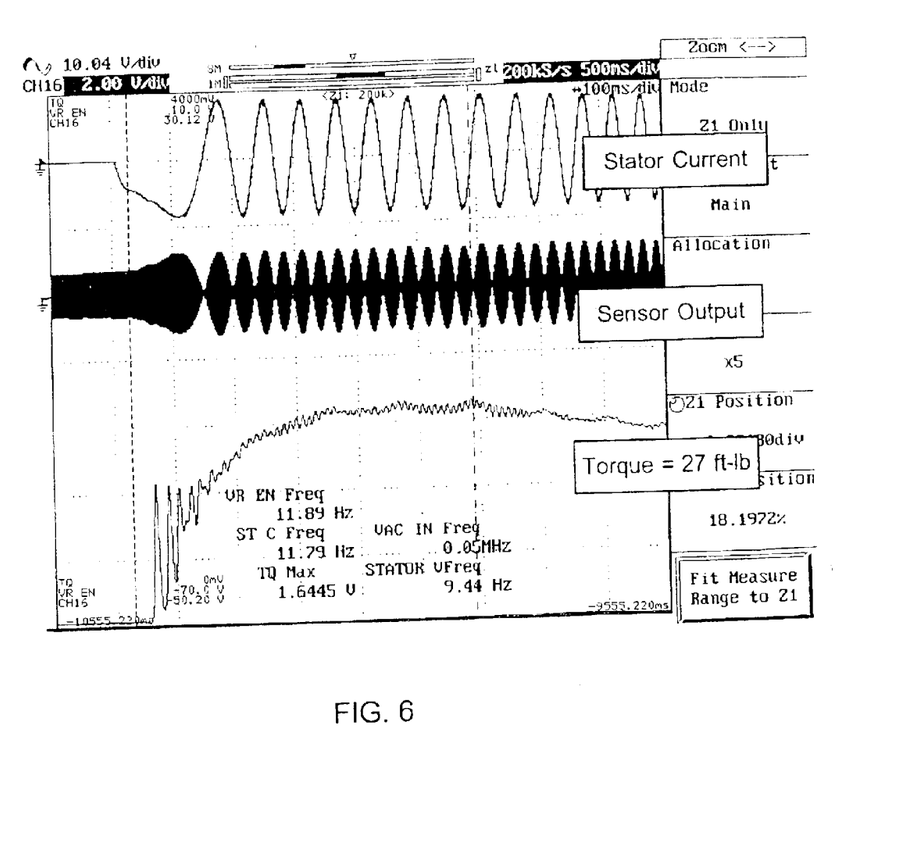
FIG. 6 is a screen capture of waveforms illustrating the starting condition of a test system using a conventional discrete position sensor.

FIG. 6 shows a screen capture of waveforms illustrating the starting condition of a test system using a conventional discrete position sensor. The top waveform is the stator current. The center waveform is the sensor output and the bottom waveform is the torque generated by the synchronous machine.

Figure 7:
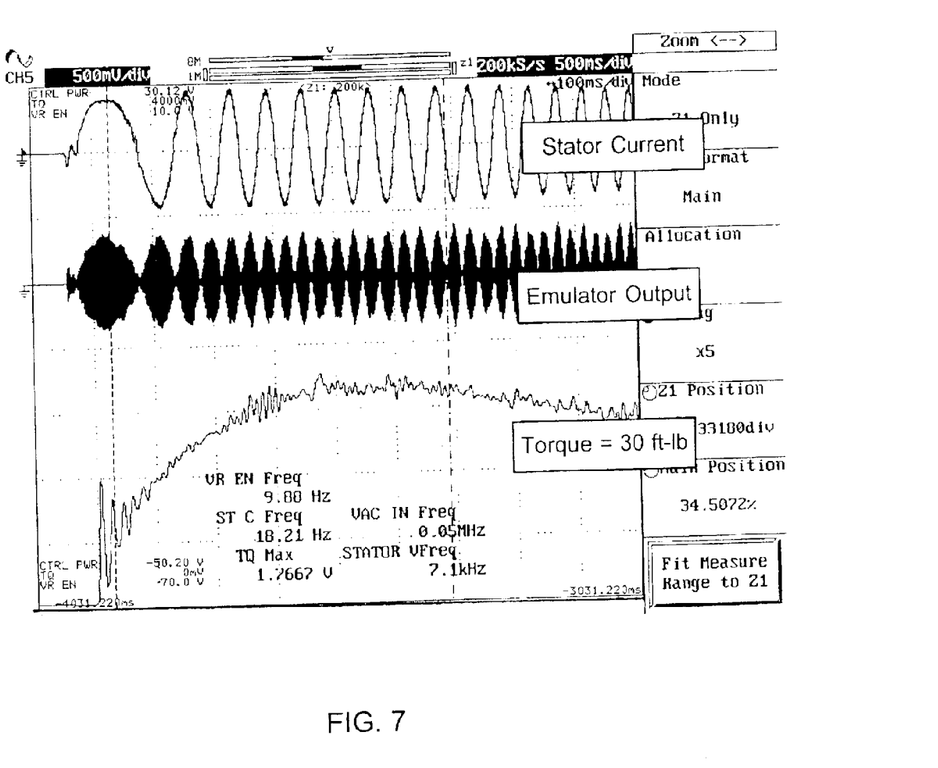
FIG. 7 is a screen capture of waveforms illustrating the starting condition of a test system using a position sensor emulator according to the present invention.

FIG. 7 is a screen capture of waveforms illustrating the starting condition of a test system using a position sensor emulator according to the present invention. The top waveform is the stator current. The center waveform is the emulator output and the bottom waveform is the torque generated by the synchronous machine. FIG. 7 illustrates several important qualities achieved by the present invention. For example, it is clear that the emulator system works even at zero speed as can be seen from the start point. Additionally, the emulator was used in direct replacement of the sensor and was not dependent on the commutation scheme of the inverter, therefore no other alterations to the test system were necessary. Also, as can be seen, the output of the emulator tracks the output of the sensor and the torque output of the synchronous machine is controlled from zero speed and throughout the acceleration of the synchronous machine.

The foregoing illustrates the principles of the invention. It will be appreciated by those skilled in the art that various arrangements of the present invention can be designed. For example, the band of the bandpass filters and converters can be implemented in analog, digital, or hybrid configurations. Those skilled in the art will appreciate that the filters and converters can be implemented in software and/or hardware or in a single device such as an application specific integrated circuit (ASIC). The band of the filters can be established in narrower or broader ranges than the examples provide. Those skilled in the art will appreciate that the ranges can be optimized based upon the specific requirements of the system and design of the synchronous machine (e.g., number of poles, and the like), which form the basis for calculating the appropriate passband frequencies. Therefore, the scope of the invention is not limited by the foregoing description but is defined solely by the appended claims.

What is claimed is:

1. A position sensor emulator comprising:
a first bandpass filter that filters phase voltage signals from a stator of a synchronous machine, wherein said synchronous machine is used simultaneously as a motor and as a position sensor;
a converter that converts the filtered phase voltages into balanced two-phase quadrature signals;
a rectifier that rectifies exciter voltage signals of the synchronous machine; and
a second bandpass filter that filters the rectified exciter voltage signals to generate a reference signal.

2. The position sensor emulator of claim 1, wherein the first and second bandpass filters have the same passband.

3. The position sensor emulator of claim 1, wherein the first and second bandpass filters have a fixed passband.

4. The position sensor emulator of claim 3, wherein the fixed passband is defined as:

$$f = 2 \cdot N_{ph} \cdot f_{ex} \pm \omega_{et}$$

wherein f is the passband, $N_{ph}$ is a number of phases in an exciter stator, $f_{ex}$ is the frequency of the exciter voltage, and $\omega_{et}$ is the top electrical angular speed of the stator of the synchronous machine.

5. The position sensor emulator of claim 1, wherein the first bandpass filter has a center frequency that tracks a frequency component containing position information.

6. The position sensor emulator of claim 1, wherein the two-phase quadrature signals are used as inputs to emulate a position sensor in a drive system for the synchronous machine.

7. The position sensor emulator of claim 1, wherein the two-phase quadrature signals and the reference signal are used as inputs to emulate a resolver in a drive system for the synchronous machine.

8. The position sensor emulator of claim 1, wherein a Clarke transformation is used to convert the filtered phase voltages into the balanced two-phase quadrature signals.

9. The position sensor emulator of claim 1, wherein the synchronous machine is used as a position sensor while operating at zero speed.

10. The position sensor emulator of claim 1, wherein the synchronous machine does not use a counter electromotive force (EMF) in order to be used as a position sensor.

11. The position sensor emulator of claim 1, wherein the synchronous machine is used as a position sensor based on similarities between a resolver and a main rotor, the main rotor being part of the synchronous machine.

12. The position sensor emulator of claim 1, wherein the filtered phase voltage signals from the stator are driven by exciter voltage signals.

13. A position sensor emulator comprising:
a first bandpass filter that filters phase voltage signals from a stator of a synchronous machine, wherein said synchronous machine is used simultaneously as a motor and as a position sensor; and
a converter that converts the filtered phase voltages into balanced two-phase quadrature signals,
wherein the first bandpass filter has a center frequency that tracks a frequency component containing position information,
wherein the center frequency is defined as:

$$f_c = 2 \cdot N_{ph} \cdot f_{ex} + \omega_e$$

wherein f is the passband, $N_{ph}$ is a number of phases in an exciter stator, $f_{ex}$ is the frequency of the exciter voltage, and $\omega_e$ is an electrical angular speed of the stator of the synchronous machine.

14. A position sensor emulator comprising:
a first bandpass filter that filters phase voltage signals from a stator of a synchronous machine, wherein said synchronous machine is used simultaneously as a motor and as a position sensor; and a converter that converts the filtered phase voltages into balanced two-phase quadrature signals, wherein the first bandpass filter has a center frequency that tracks a frequency component containing position information, wherein the center frequency is defined as:

$$f_c = 2 \cdot N_{ph} \cdot f_{ex} - \omega_e$$

wherein f is the passband, $N_{ph}$ is a number of phases in an exciter stator, $f_{ex}$ is the frequency of the exciter voltage, and $\omega_e$ is an electrical angular speed of the stator of the synchronous machine.

15. A position sensor emulator comprising:

a first bandpass filter that filters phase voltage signals from a stator of a synchronous machine, wherein said synchronous machine is used simultaneously as a motor and as a position sensor;

a converter that converts the filtered phase voltages into balanced two-phase quadrature signals; and a switch for switching position feedback from the position sensor emulator during a zero and low speed condition, wherein the low speed condition is to approximately 10%–25% of top speed of the synchronous machine, to a high speed control scheme that does not use the position sensor emulator.

16. A method for emulating a position sensor comprises:

bandpass filtering phase voltage signals from a stator of a synchronous machine, wherein said synchronous machine is used simultaneously as a motor and as a position sensor;

converting the filtered phase voltages into balanced two-phase quadrature signals;

rectifying exciter voltage signals of the synchronous machine; and bandpass filtering the rectified exciter voltage signals to generate a reference signal.

17. The method of claim 16, wherein the bandpass filtering of the phase voltage signals and of the rectified exciter voltage signals has the same passband.

18. The method of claim 16, wherein the bandpass filtering of the phase voltage signals and of the rectified exciter voltage signals has a fixed passband.

19. The method of claim 18, wherein the fixed passband is defined as:

$$f = 2 \cdot N_{ph} \cdot f_{ex} \pm \omega_{et}$$

wherein f is the passband, $N_{ph}$ is a number of phases in an exciter stator, $f_{ex}$ is the frequency of the exciter voltage, and $\omega_{et}$ is the top electrical angular speed of the stator of the synchronous machine.

20. The method of claim 16, wherein the bandpass filtering of the phase voltage signals and of the rectified exciter voltage signals has a center frequency that tracks a frequency component containing position information.

21. The method of claim 20, wherein the center frequency is defined as:

$$f_c = 2 \cdot N_{ph} \cdot f_{ex} + \omega_e$$

wherein f is the passband, $N_{ph}$ is a number of phases in an exciter stator, $f_{ex}$ is the frequency of the exciter voltage, and $\omega_e$ is an electrical angular speed of the stator of the synchronous machine.

22. The method of claim 20, wherein the center frequency is defined as;

$$f_c = 2 \cdot N_{ph} \cdot f_{ex} - \omega_e$$

wherein f is the passband, $N_{ph}$ is a number of phases in an exciter stator, $f_{ex}$ is the frequency of the exciter voltage, and $\omega_e$ is an electrical angular speed of the stator of the synchronous machine.

23. The method of claim 16, wherein the two-phase quadrature signals are used as inputs to emulate a position sensor in a drive system for the synchronous machine.

24. The method of claim 16, wherein the two-phase quadrature signals and the reference signal are used as inputs to emulate a resolver in a drive system for the synchronous machine.

25. The method of claim 16, wherein a Clarke transformation is used to convert the filtered phase voltages into the balanced two-phase quadrature signals.

26. A method for emulating a position sensor comprising:

bandpass filtering phase voltage signals from a stator of a synchronous machine, wherein said synchronous machine is used simultaneously as a motor and as a position sensor;

converting the filtered phase voltages into balanced two-phase quadrature signals; and switching position feedback from the position sensor emulation during a zero and low speed condition, wherein the low speed condition is to approximately 10%–25% of top speed of the synchronous machine, to a high speed control scheme that does not use the position sensor emulator.

27. The position sensor emulator of claim 12, wherein the phase voltage signals are continuously detected.

* * * * *